(12) United States Patent
Palmer

(10) Patent No.: US 6,405,932 B1
(45) Date of Patent: Jun. 18, 2002

(54) HOT WATER TEMPERATURE CONTROL VALVE SYSTEM

(75) Inventor: Robert Palmer, Hopatcong, NJ (US)

(73) Assignee: Strahman Valves, Inc., Florham Park, NJ (US)

( * ) Notice: Subject to any disclaimer, the term of this patent is extended or adjusted under 35 U.S.C. 154(b) by 0 days.

(21) Appl. No.: 09/796,850

(22) Filed: Mar. 1, 2001

(51) Int. Cl.[7] .............................................. G05D 23/13
(52) U.S. Cl. .................................. 236/12.1; 236/12.13
(58) Field of Search ............................. 236/12.1, 12.13

(56) References Cited

U.S. PATENT DOCUMENTS

| | | |
|---|---|---|
| 1,243,999 A | 10/1917 | Snediker |
| 2,211,058 A | 8/1940 | Guthmann |
| 2,269,259 A | 1/1942 | Fields |
| 2,826,367 A * | 3/1958 | Cobb ..................... 236/12.13 |
| 2,901,174 A * | 8/1959 | Branson ................. 236/12.13 |
| 3,805,836 A * | 4/1974 | Veale .................... 236/12.13 |
| 4,249,695 A | 2/1981 | Dreibelbis |
| 4,286,749 A | 9/1981 | Oguma |
| 4,607,788 A | 8/1986 | Bendall et al. |
| 4,669,653 A * | 6/1987 | Avelov ................... 236/12.13 |
| 5,011,074 A | 4/1991 | Kline |
| 5,323,960 A | 6/1994 | Kline |
| 5,340,018 A | 8/1994 | MacDonald |
| 5,350,112 A * | 9/1994 | Stein ..................... 236/12.13 |
| 6,119,947 A * | 9/2000 | Couture et al. .......... 236/12.13 |
| 6,250,559 B1 * | 6/2001 | Knauss .................... 236/12.2 |

* cited by examiner

Primary Examiner—William C. Doerrler
Assistant Examiner—Mohammad M Ali
(74) Attorney, Agent, or Firm—Carella Byrne Bain Gilfillan et al; John G. Gilfillan II; William Squire

(57) ABSTRACT

A retrofit automatic temperature controlling apparatus and kit is attached to a prior art steam-cold water mixing valve assembly to produce mixed cold water and steam as hot water at a controlled temperature. An adjustment screw is added to the prior art valve assembly to limit the displacement of a steam poppet valve which is opened by a retrofitted piston. Cold water is redirected to a retrofit temperature control assembly having a mixing chamber for receiving the cold water. A water and steam receiving conduit terminates in the mixing chamber and has fluid isolated sections for receiving steam and cold water with a sleeve valve member for selectively coupling the steam and cold water sections to the mixing chamber. The sleeve valve member is operated by a temperature sensing device in the outlet hot water chamber. A disc member separates the mixing chamber and outlet hot water chamber with small passages which promote mixing.

18 Claims, 6 Drawing Sheets

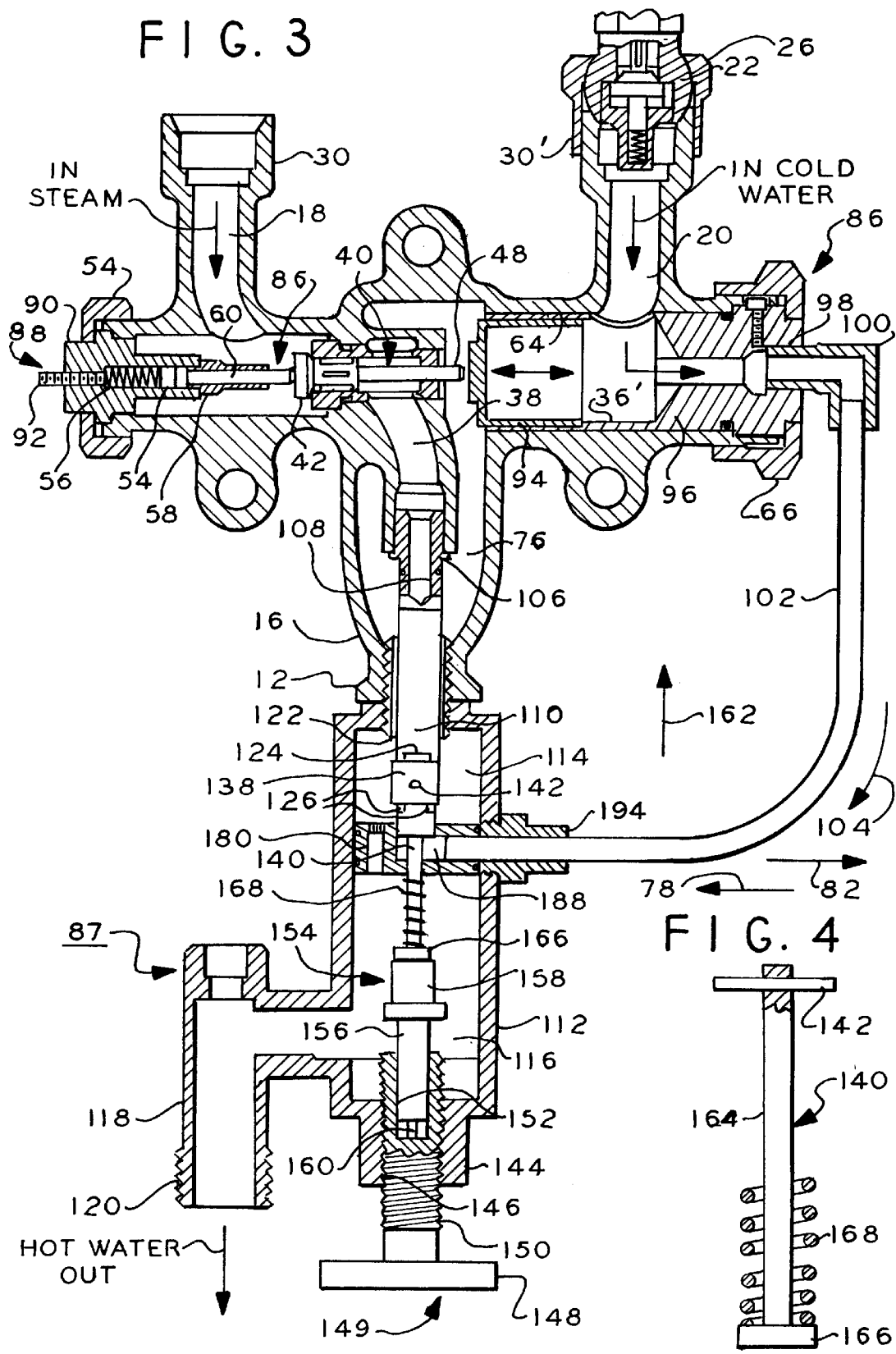

HOT WATER TEMPERATURE CONTROL VALVE SYSTEM

This invention relates to cold water-steam mixing valves for creating hot water, and more particularly, to thermostatic hot water temperature controlling mixing valves.

U.S. Pat. No. 5,011,074 discloses a thermostatic mixing valve with thermostat failure control. A thermally controlled mixing valve assembly includes a valve body having a hot fluid inlet, a cold fluid inlet, a fluid mixing chamber and a fluid outlet in communication with the mixing chamber. A thermostat is in the mixing chamber. A piston responsive to the thermostat controls flow through cold fluid slots and a disc responsive to the thermostat controls flow through a hot fluid opening in a cylindrical liner having the slots and the opening at the bottom of the liner. A spring biases the actuator assembly upward against the downward motion of the thermostat. In case of failure the spring closes the hot fluid opening in the liner.

U.S. Pat. No. 1,243,999 discloses a thermostatic steam and hot water mixer. Cold water and steam are connected to inlet check valves. A thermostat comprises a metallic diaphragm bellows located in a casing filled with temperature responsive liquid. The steam is controlled to deliver hot water. A rod is connected to the bellows. An increase in temperature causes an expansion of liquid within the bellows container and compresses the bellows. This actuates the rod and closes a steam valve against a compression spring. The supply of cold water is constant with the supply of steam being varied to maintain the desired temperature.

U.S. Pat. No. 2,211,058 discloses a fluid control device for delivering fluids from a plurality of sources one of which is fluctuating and being adapted by automatic selective operation to deliver fluid from the fluctuation source at such times as the supply from that source is adequate to meet the requirements. The device delivers and combines steam with water in regulated controlled amounts. Admission of steam is from a manual valve. Live steam exerts a pressure against a sleeve tending to elevate or retract the sleeve and with it an outer sleeve. The elevation of the parts opens ports and establishes communication between the source of water and a combining tube and brings another port into registration with other ports so that live steam will pass from a tube into a combining chamber heating the water. This results in the selection of the number, location and size of the ports to provide a regulated controlled ratio of water and steam flow to provide a stable operation.

U.S. Pat. No. 2,269,259 discloses a mixing device for hot and cold water. A sleeve moves to restrict one set of ports without affecting another set of ports. The sleeve is moved by a piston. To control the piston, the piston has opposite bores with a valve member slidably mounted in the bores. The valve member moves into and out of the bores variably to restrict the flow of fluid from one side or the other of the piston into the mixing chamber. A bimetal strip controls the valve. The temperature of the water flexes the strip causing it to open and close the valves and move the piston so as to equalize pressure on opposite sides of the piston when the temperature is correct. Cold or hot temperatures cause the piston to move in a direction to equalize the temperature. In an embodiment shown, either hot or cold water alone may be provided.

In U.S. Pat. No. 4,249,695 a thermally actuated modulating valve and systems are disclosed for providing temperature controlled heated water. Cold water is supplied to a cold water chamber utilizing a slide valve sleeve which outputs to separate chambers proportional amounts of cold water to a hot water source to heat the water and to a mixing chamber for mixing a proportional amount of cold water with hot water. A temperature sensing bellows is in a transfer chamber for sensing the temperature of water supplied from the mixing chamber. Hot water is supplied to the mixing chamber from a hot water source and mixed with the cold water from the proportioning valve. The cold water from the proportioning valve is also supplied to the hot water source for heating the water. The sensed temperature causes the bellows to move a rod which displaces the sleeve valve member which controls the amount of cold water supplied to the hot water source and the cold water supplied to the mixing chamber. Temperature adjustment and calibration devices are provided for adjusting the position of the bellows and in turn the valve operating rod.

In U.S. Pat. No. 4,1286,749 an automatic fluid mixing valve is disclosed for mixing hot and cold fluids. Pressure control means control the ratio of fluid flow of the low and high temperature fluids to maintain the temperature using a temperature sense means. The flow rate of the cold water is varied in accordance with the flow rate of hot water. Pressure changes of cold water changes causes a change in the rate of flow of hot water. Pressure ratio of both fluids is maintained at a predetermined value. A movable valve member is moved by bending of a temperature sense means to open and close gates according to the sensed temperature.

U.S. Pat. No. 4,607,788 discloses a valve for mixing hot and cold water with a hollow body and internal sleeve that define chambers between the sleeve and body communicating with hot and cold water sources. Valves are opened and closed by a piston in response to displacement by a diaphragm that senses the temperature of the mixed water. The piston moves between first and second valve seats. One valve opens and closes the cold water inlet and the other opens and closes hot water inlet. The piston proportions the amount of hot and cold water flowing in their respective passageways into the mixing chamber to stabilize the outlet temperature.

U.S. Pat. Nos. 5,323,960 and 5,340,018 disclose still other arrangements of thermostatically controlled mixing valves.

In FIGS. 1 and 2, a prior art thermostatic wall mounted temperature indicating mixing valve assembly 10 is used to provide hot water by mixing pressurized steam with cold water. The hot water is supplied to a conventional water spray nozzle (not shown) such as shown in commonly owned U.S. Pat. No. 5,660,333 via a hose (not shown) connected to the mixed steam-cold water hot water outlet 12 of the assembly 10. A rigid metal bent rod support 14 secured to the housing body 16 of assembly 10 carries the hose (not shown) connected to outlet 12. Assembly 10 includes a bronze body 16. The body 16 has a pressurized steam inlet 18 and a pressurized cold water inlet 20. Inlet 20 receives cold water in the pressure range of about 40 to 80 lb. A ball check valve assembly 22 is attached to each inlet 18, 20 via gasket 24. A ball check union nut 26 connects assembly 22 and gasket 24 to the steam inlet extension 30 of body 16. Extension 30' receives the union nut 26 and assembly 22 at the cold water inlet 20. Manual valves 28, FIG. 1, are connected to assembly 22 threaded extension end 32 at the cold water and steam inlets.

Steam inlet 18, which receives pressurized steam in the range of 80 to 150 lb. is coupled to steam receiving chamber 34 in the body 16. Cold water inlet 20 is coupled to cold water receiving chamber 36 in the body 16. Chamber 34 is coupled to steam conduit 38 by poppet valve assembly 40. Poppet valve assembly 40 includes a poppet valve 42 that engages poppet valve seat member 44. The poppet valve 42 has a head 46 that seats against seat member 44 and has a stem 48 that guides the valve 42 in a mating member attached to the body 16. Fins 50 create fluid channels for steam to flow to conduit 38 when the valve 42 is open. A steam jet 49 is located at the exit portion of conduit 38 to drop the pressure of the steam to about 40 to 50 lb. This is so that the higher steam pressure does not force the cold water at the lower pressure than the incoming steam back out of the inlet 20. The steam jet 49 outputs steam into steam-cold water mixing chamber 51.

Nut 54 secures cap 52 to the body 16 to enclose the steam chamber 34 to the ambient atmosphere. The cap 52 has a poppet engagement member 54 head receiving bore in which a spring 56 is also located. The member 54 has a stem 60 attached to the engagement member head and which is guided by engagement member poppet stop and guide 58 threaded to the cap 52 bore. The stem 60 is movable in the cap 52 bore and abuts the poppet valve 42 head to resiliently permit the valve 42 to open. The stop and guide 58 limits the amount the poppet valve 42 may open to admit steam to conduit 38.

A housing cap 62 encloses the cold water chamber 36 to the ambient atmosphere and forms a cold water receiving chamber36' and a cylinder 64 in the chamber 36. A nut 66 attaches the cap 62 to the body 16. A water chamber alignment screw 68 is attached to the cap 62 to align the cap chamber 36' inlet port to the inlet 20. O-rings 70 seal the cap 62 to the body 16 in chamber 36.

A cylindrical hollow piston 72 is slidably located in the cylinder 64. The piston has an end cap 74 which seals the piston hollow core from communication with cold water conduit 76 externally the steam conduit 38. The end cap 74 is adjacent to the extended end of the poppet valve stem 48 and engages the stem 48 when the piston 72 is displaced in direction 78. The piston 72 cylindrical wall has an annular array of through holes 80.

Holes 80 are positioned on the piston so that in the normal quiescent position shown in FIG. 2, with no cold water in the inlet 20, the spring 56 forces the stem 60 in direction 82. The stem 60 engages the poppet valve 42 and forces it in direction 80. This engages the poppet valve stem 48 with the piston end cap 74 placing the piston 74 in the position shown. In this position the holes 80 are within the cylinder 64 and are blocked and no cold water can enter the cold water conduit 76.

In operation, pressurized cold water enters the chamber 36' from inlet 20. The water forces the piston 72 to the left in FIG. 2, direction 78. The piston 72 engages the stem 48 of the poppet valve 42 and displaces the poppet valve in direction 78 opening this valve. At the same time cold water enters the holes 80 in the piston which holes are now located in the cold water conduit 76 admitting cold water into conduit 76. At this time pressurized steam flows to the conduit 38 and through the jet 49 into the mixing chamber 51. The steam and cold water mix in the mixing chamber forming hot water which flows out of outlet 12.

A temperature indicating gauge 84, FIG. 1, is attached to the housing 16 to indicate the temperature of the mixed hot water at the outlet 12 via a tube (not shown) coupled to the outlet 12.

This prior art cold water-steam mixing valve assembly is in wide use and popular. It is rugged and has a long life. However, the problem with this assembly is that as the input water and steam pressures vary, the temperature of the mixed hot water also will fluctuate. It is recognized by the present invention that there is a need for a retrofit assembly to the above described prior art hot water valve assembly that will utilize the majority of the components of that valve assembly and at the same time provide controlled temperature of the produced hot water.

There is also recognized a need for a valve assembly that provides temperature controlled hot water in the presence of widely fluctuating steam and cold water pressures employing many of the components of the above described hot water valve assembly.

A hot water temperature controlling apparatus according to the present invention is for retrofit attachment to a cold water-steam valve assembly for mixing steam with cold water supplied from the valve assembly to produce controlled temperature hot water, the valve assembly for receiving pressurized steam and for receiving pressurized cold water. A poppet valve is in a steam receiving chamber having open and closed states for selectively supplying pressurized steam to a jet to reduce the pressure of the received steam applied to a steam outlet conduit. A cold water receiving chamber receives cold water and has a cold water outlet. A piston is in the cold water receiving chamber and is responsive to received pressurized cold water for opening the poppet valve.

The water temperature controlling apparatus comprises first means arranged and dimensioned for receiving the steam from the steam outlet conduit and for receiving the cold water from the cold water chamber outlet; and temperature control means arranged to be attached to the valve assembly including temperature sense means for receiving the steam and cold water from the first means and having a steam-cold water mixing chamber for mixing the received steam and cold water to produce hot water, the temperature sense means including means responsive to the sensed temperature of the hot water to control the respective amounts of steam and cold water supplied to the mixing chamber to control the temperature of the hot water.

In one aspect, the mixing chamber is formed by a housing and a hot water outlet wall, the hot water outlet wall having a plurality of apertures there through arranged for enhancing the mixing of the steam and cold water and for supplying the mixed steam and cold water to a hot water outlet conduit.

In a further aspect, the temperature control means comprises a fluid conduit located in the mixing chamber, the fluid conduit having a first section for receiving the cold water and a second section fluid isolated from the first section for receiving the reduced pressure steam, and a sleeve over the fluid conduit for selectively fluid coupling the first and second sections to the mixing chamber in accordance with the value of the sensed temperature of the mixed steam and cold water.

In a further aspect, the fluid conduit has a longitudinal axis, the fluid conduit having a first fluid opening in the first section and a second fluid opening in the second section axially spaced from the first opening, each opening being of a given area magnitude for providing fluid communication between the respective fluid conduit first and second sections and the mixing chamber, the sleeve being arranged to selectively set and apportion the magnitude of the openings in fluid communication with the mixing chamber simultaneously in accordance with the sensed temperature value.

In a further aspect, the magnitude of each the openings is varied inversely by the position of the sleeve along the conduit.

In a further aspect, the first and second openings are each oriented on a radius extending from the axis, the radii being oriented in different radial positions relative to a reference position about the axis for enhancing mixing of the steam and cold water.

In a further aspect, the radii are oriented at about right angles relative to each other about the axis.

In a further aspect, the fluid openings each are in the form of a slot extending transversely the axis.

In a further aspect, the apparatus further includes means for settably setting the maximum displacement value the poppet valve can open.

In a further aspect, the temperature control means comprises a body having the mixing chamber, connecting means for connecting the body to the valve assembly, a first fluid conduit having first and second fluid isolated sections, the sections being located in the mixing chamber, the first section coupled to the valve assembly for receiving the reduced pressure steam, each section having an opening fluid coupled to the mixing chamber; a second fluid conduit coupled to the cold water outlet for receiving the cold water and applying the cold water to the second section, a valve member coupled to the first fluid conduit for selectively opening and closing the openings of the first and second sections in fluid communication with the mixing chamber to proportion the amount of steam and cold water supplied to the mixing chamber; a temperature sensing device secured to the body for sensing the temperature of hot water in the mixing chamber and for setting the position of the valve member in the mixing chamber according to the sensed temperature; and a hot water outlet chamber coupled to the mixing chamber for outputting hot water generated in the mixing chamber.

In a still further aspect, the mixing chamber includes a wall member separating the mixing chamber from the hot water outlet, the wall member including a plurality of apertures therethrough arranged to enhance mixing of the steam and cold water and to provide passage of the mixed hot water from the mixing chamber to the hot water outlet chamber.

In a further aspect, calibration means are coupled to the body and to the temperature sense means for adjustably setting the temperature of the mixed hot water.

In a still further aspect, a hot water temperature controlling apparatus according to the present invention comprises a body having a steam receiving chamber, a cold water receiving chamber, and a steam-cold water mixing chamber for producing hot water, the cold water receiving chamber having a cold water outlet conduit, the steam receiving chamber having a steam outlet conduit. A poppet valve is in the steam receiving chamber having open and closed states for selectively supplying pressurized steam to the steam outlet conduit. A piston is in the cold water receiving chamber and is responsive to received pressurized cold water for opening the poppet valve. A first fluid conduit is secured to the body at least a portion of which conduit is in the mixing chamber and having first and second fluid isolated sections in the mixing chamber, the first section for receiving the steam from the steam outlet conduit and the second section for receiving the cold water from the cold water outlet conduit. Valve means comprise a sleeve coupled to the first conduit for selectively opening and closing fluid coupling of the first and second sections to the mixing chamber. Temperature sense means is coupled to the valve means and is responsive to the sensed temperature of the mixed hot water in the mixing chamber to displace the sleeve and control the respective amounts of steam and cold water supplied to the mixing chamber by the sleeve to thereby control the temperature of the hot water.

IN THE DRAWING

FIG. 3 is a sectional elevation view of the valve assembly according to an embodiment of the present invention;

FIG. 4 is a side elevation view of a temperature sensing actuating member used in the embodiment of FIG. 3;

Figure 2:
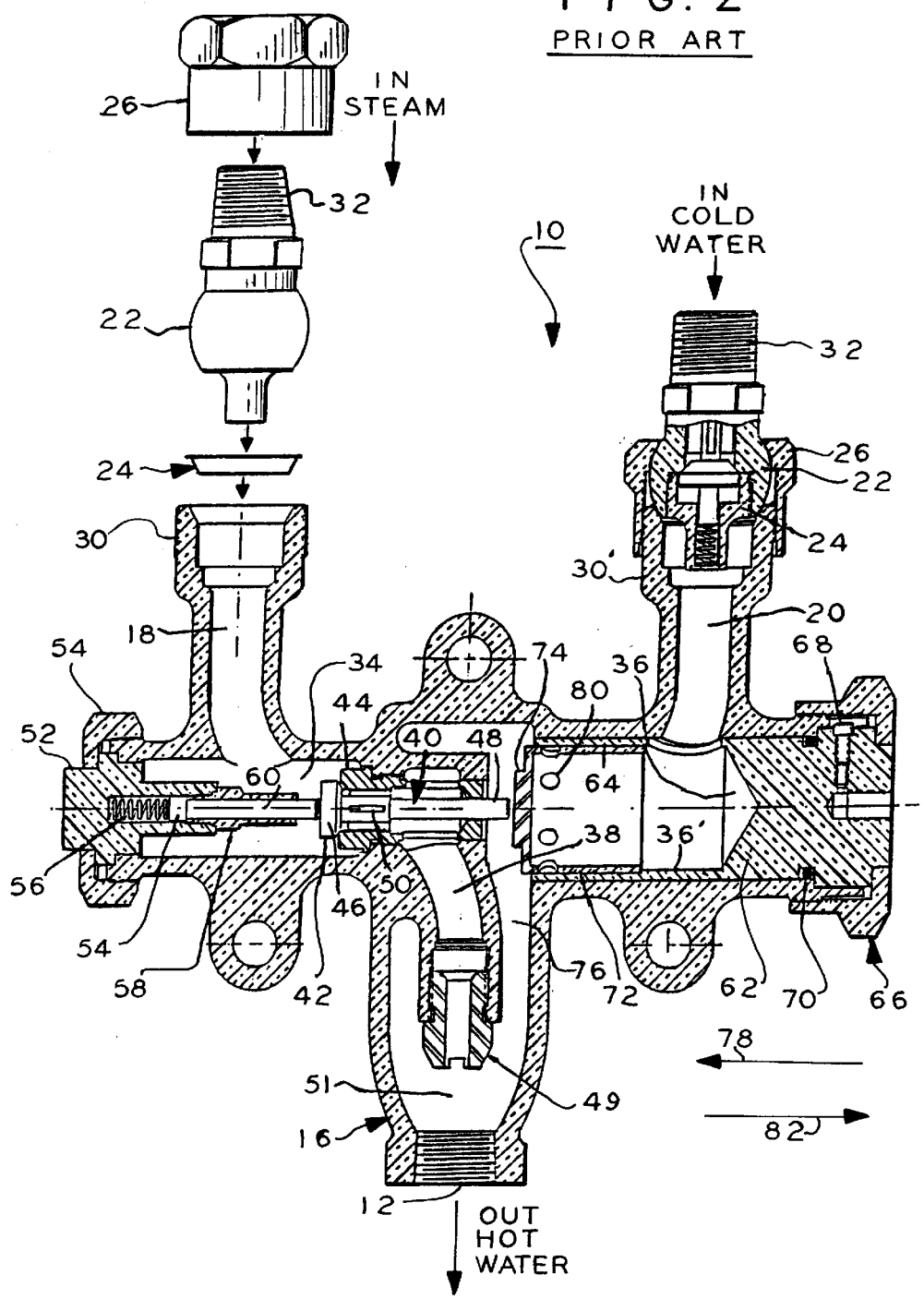
FIG. 2 is a sectional elevation, partially exploded, view of the valve system of FIG. 1.

In the drawing like reference numerals refer to like parts throughout. The body 16 and many of the components of the valve assembly 86 are the same as described in the introductory portion in connection with FIG. 2. Poppet adjustment assembly 88 differs from the prior art assembly 10 of FIG. 2. Poppet valve adjustment assembly 88 includes a cap 90 having an adjustment screw 92 passing therethrough. The screw 92 passes through the spring 56 and engages the poppet engagement member 54. The screw adjustable sets the maximum amount the poppet valve 42 can open by setting the distance between the stop member 54 stem 60 and the closed poppet valve.

Piston 94 is located in the cold water chamber 36' formed by cap 96. Piston 94 is similar to the prior art piston 72, FIG. 2, except the piston 94 has no holes 80. Thus cold water in the chamber 36' can only displace in directions 78 and 82 but does not permit any cold water to enter the conduit 76.

The cap 96 has a bore 98 in which is fitted an L-shaped nipple fitting 100 having a hollow core that is in fluid communication with the cold water chamber 36'. A cold water tube conduit 102 is connected to the nipple fitting 100 to receive the cold water in the chamber 36' with the pressurized water flowing in direction 104.

Steam pressure reducing jet 106 has an outlet nozzle 108 that is inside of conduit 110, preferably a stainless steel tube, and sealed therein by an O-ring.

An automatic temperature controlling retrofit water-steam mixing assembly 87 is attached to the prior art body 16 by coupling member 122. The assembly 87 automatically controls the temperature of the mixed hot water within a desired range of temperatures regardless the possible inlet pressures of the steam and cold water in a wide range of inlet pressures.

The assembly 87 includes a cast bronze housing body 112 that has a hot water mixing chamber 114 and a hot water outlet chamber and conduit 116 which is fluid coupled to hot water outlet nozzle 118. A hose (not shown) is connected to the threads 120 on the nozzle 118. The housing body 112 is connected to cast bronze housing body 16 of valve assembly 86 by the metal threaded coupling member 122.

The conduit 110 has an end 136 that extends through the coupling member 122 into the mixing chamber 114. The conduit 110, FIGS. 5–8, is circular cylindrical and has two sets slots, each set comprising either slots 124 or slots 126. The slots 124 are coplanar on a plane normal to axis 134 and receive steam and the slots 126 are coplanar on a plane normal to axis 134 and receive cold water for respectively supplying steam and cold water to the mixing chamber 114 (FIG. 3). In FIG. 7, the conduit 110 has an internal wall 128 with a preferred internal diameter of about 9/16 inches. Wall 28 comprises a metal disc which may be welded to conduit 110, and which fluid isolates section 130 from section 132 of the conduit 110 interior 140. Thus, only slots 124 are in fluid communication with section 130 and only slots 126 are in fluid communication with section 132. The exterior surface of the conduit 110, however, is one continuous tube. Thus, only steam from the jet 106 (FIG. 3) is fluid coupled to slots 124.

Figure 8:
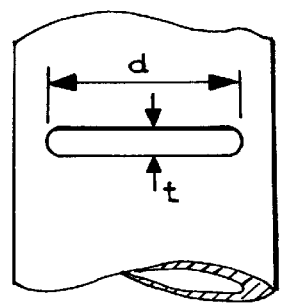
FIG. 8 is a side elevation fragmented view of the conduit of FIG. 5 showing one of the fluid openings therein.

The steam slots 124 have a length d, FIG. 8, of about 9/16 inches and a height t of about 1/8 inches in this embodiment for steam pressure at the jet 106 output of nominally about 50 lb and water pressure in the range of about 40 to 80 lb. The cold water slots 126 have a length d of about 15/32 inches and a height t of about an 1/8 inches in this embodiment. The slots 124 and 126 are axially spaced along axis 1 1/32 inches center to center in this embodiment, these dimensions being critical to obtain the proper mixing of steam and cold water in the present embodiment. These dimensions are given by way of example as they are determined empirically for each implementation depending upon fluid pressures, flow rates, and dimensions of the chambers and conduits and so on. One of ordinary skill can develop such dimensions according to a given implementation.

Figure 5:
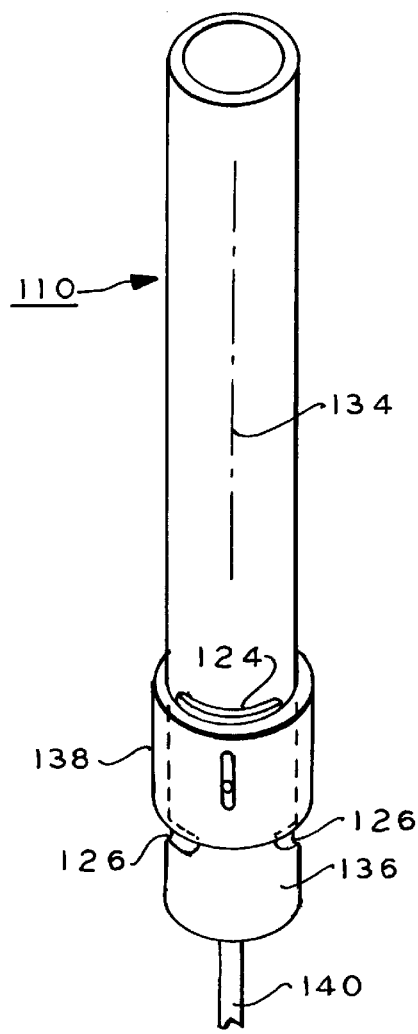
FIG. 5 is a side elevation view of a steam and cold water receiving conduit and valve used in the embodiment of FIG. 3.
Figure 6:
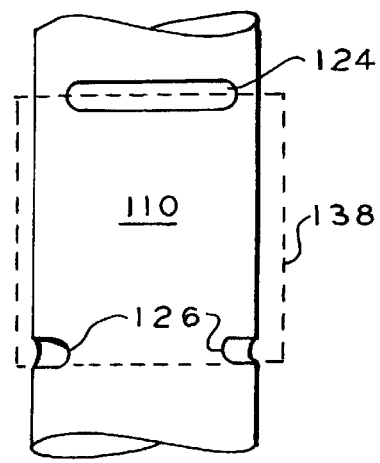
FIG. 6 is a fragmented more detailed view of the conduit of FIG. 5 for showing the fluid openings communicating with the mixing chamber of the assembly of FIG. 3.
Figure 7:
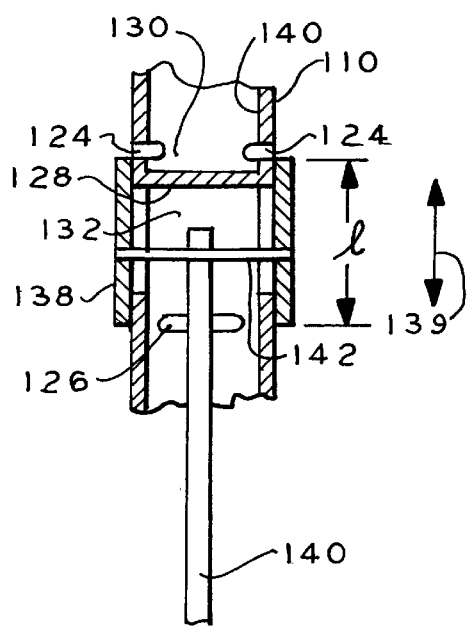
FIG. 7 is a fragmented side elevation sectional view of a portion of the conduit and valve of FIG. 5.

In FIGS. 5–7, circular cylindrical sleeve 138 is slidably secured for axial displacement over the conduit 110 in close dimensional relation thereto. The sleeve 138 forms a valve for opening and closing the fluid communication of the interior of conduit 110 via slots 124 and 126 to the chamber 114. In FIG. 6, the sleeve 138 is shown in phantom to show the relationship of the sleeve to the slots 124 and 126. The sleeve has an axial length dimension l, FIG. 7, such that the slots 124 are partially blocked (closed) by the sleeve 138 when the slots 126 are fully blocked. In the converse, when the slots 124 are fully blocked, the slots 126 are partially blocked. Thus, at the extreme axial positions of the sleeve 138 only one set of slots is fully closed while the other set is only partially closed.

In FIG. 3, body 112 has a boss 144 with a threaded bore 146. A calibration screw 149 includes a knob 148 with a threaded shank 150 attached to threaded bore 146. The shank 150 has a bore 152. A conventional temperature sensing device 154 has a portion 156 mounted in the bore 152. The device 154 has a body 158 which may be filled with temperature sensitive wax for example which expands and contracts in the presence of corresponding sensed temperature fluctuations in the chamber and conduit 116. This expansion and contraction is transmitted to the device 154 rod 160. The rod 160 abuts the blind bottom wall of bore 152. As the wax in the body 158 expands and contracts, the rod 160 respectively extends from or is retracted into the portion 154 accordingly. As the rod extends from portion 156 it pushes the body 158 upwardly in direction 162 and vice versa.

Actuator 140, FIG. 4, has a shank 164 and a head 166. A compression spring 168 is about the shank 164 and abuts the head 166. In FIG. 3, the head 166 abuts the temperature sensing device 154 body 158 and is displaced with the body 158 as the rod 160 moves in or out of the device portion 156 in response to the sensed temperature of fluid in the conduit 116. The spring 168 keeps the actuator 140 engaged with the device body 158 and also pushes on the device 154 and, thus, rod 160 against the blind bottom wall of bore 152 in the calibration screw 149.

Figure 9:
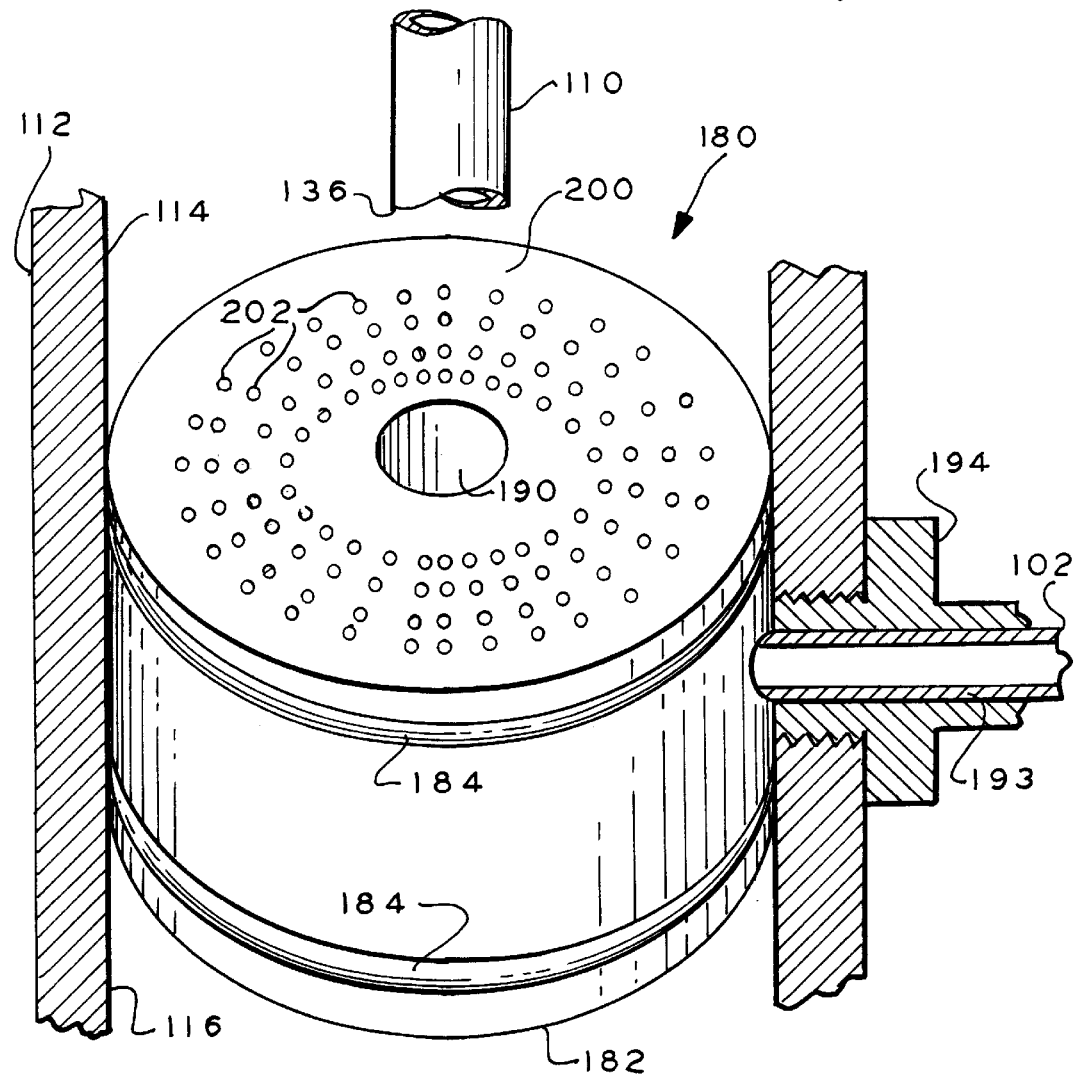
FIG. 9 is a fragmented isometric view of a bottom wall of the mixing chamber of the assembly of FIG. 3.
Figure 10:
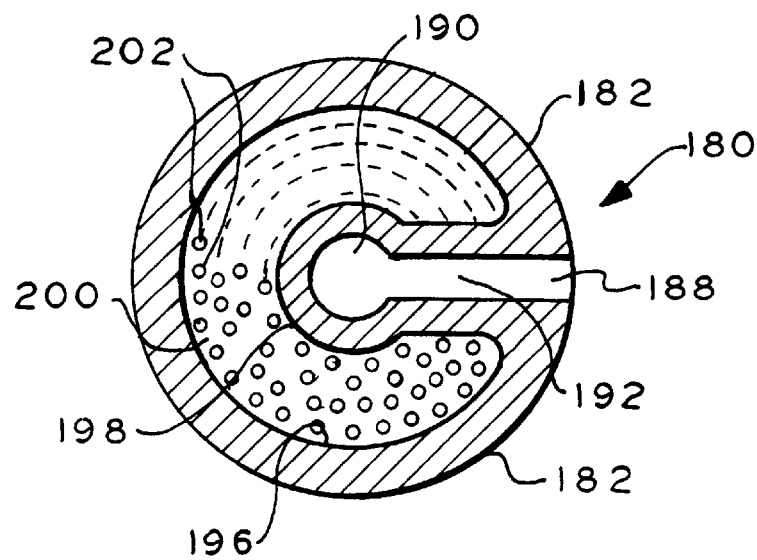
FIG. 10 is a bottom plan view of the wall of FIG. 9.
Figure 11:
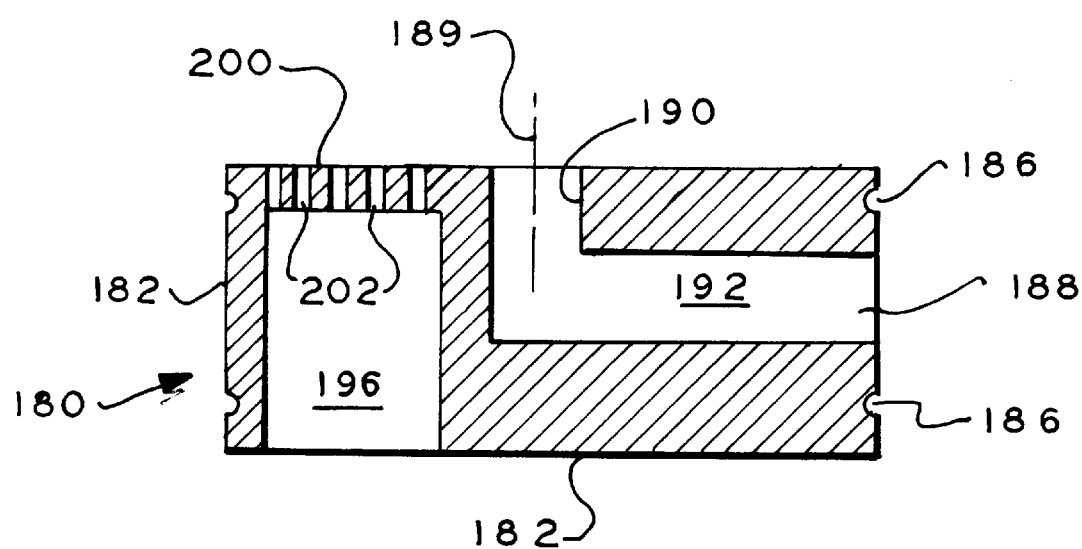
FIG. 11 is a sectional elevation view of the wall of FIG. 9.

A disc member 180 divides the circular cylindrical hollow core of housing body 112 into mixing chamber 114 and dispensing chamber and conduit 116. In FIGS. 9–11, disc member 180 comprises a preferably circular cylindrical brass body 182 that fits within the hollow core of the body 112 and is fluid sealed thereto by O-rings 184 mounted in two spaced parallel circumferential grooves 186 in the body 182 peripheral surface. The body 182 has an L-shaped bore 188 with an axially aligned on axis 189 first section 190 which receives the end 136 of conduit 110. The conduit 110 is press fit attached to section 190 to thereby secure the disc member body 182 in fixed axial position in the housing body 112. The conduit 110 axis 134, FIG. 5, is aligned on the bore section 190 axis 189. Bore 188 has a second section 192 at right angles to section 190. Section 192 receives the end 193 of cold water conduit 102, FIG. 3. The conduit 102 end 193 is secured in place by fitting 194, FIG. 3.

The disc member 180, FIGS. 10 and 11, has a recess 196 forming a boss 198 in which the bore 188 is formed. The recess 196 forms a top wall 200 through which a plurality of small diameter fluid passages 202 are formed. Preferably, in this embodiment, the passages are about 0.078 inches (2 mm) in diameter. The disc member 180 is preferably about 1.8 inches (4.6 cm) in diameter corresponding to the inside diameter of chamber 114 and conduit 116, which is circular cylindrical.

In operation, screw 92 in valve assembly 86, FIG. 3, is turned all the way in until the stem 60 abuts the closed poppet valve 42. The poppet valve can not open in this position of the screw 92. The screw is then backed out about 3/4 to 1 1/2 turns to accommodate the full steam input pressure range (the screw 92 is 28 pitch). This stabilizes the system to minimize hammering, noise and vibration due to improper steam and water proportions and poor mixing of the steam and hot water. This adjustment tunes the desired input steam pressure to obtain optimum mixing of steam and cold water. The spring 56 permits the poppet valve to resiliently open in direction 78 until stopped by stop screw 92. The steam pressure is in the range of 80 to 150 lb. at inlet 18.

Cold water is inputted at inlet 20. The cold water enters chamber 36' in a pressure range of 40 to 80 lb. This pressure displaces the piston 94 in direction 78. The piston engages the poppet valve stem 48, opens the poppet valve and permits steam to enter the conduit 38. At the same time cold water has been flowing in the conduit 102 into the chamber 114 through the disc member 180 into the conduit 110.

At this time the temperature sensed by sensor device 154 is such that steam enters the chamber 114 through slots 124 and cold water enters the chamber 114 through the slots 126 (FIG. 7). The steam and water enter into the chamber 114 at right angles to each other. This right angle orientation was found to be important in that when the steam and water slots were oriented in the same radial direction emanating from the axis 134, FIG. 5, the system exhibited poor mixing. It is not understood why this poor mixing occurred. However, it is known that the right angle orientation of the two sets of slots results in proper mixing of steam and cold water.

In addition, the disc member 180, FIGS. 3, 9 and 11, passages 202 also assist in the mixing process of the steam with cold water. It is believed these passages create sufficient back pressure to assure the steam and water mix prior to exiting the mixing chamber 114. Without the disc member 180, improper mixing occurs. That is, the steam and water might separately exit the chamber 114 without mixing if a slight back pressure were not present due to the presence of the disc member 180 and the relatively small passages 202 therethrough. Once the mixed fluid enters the outlet chamber and conduit 116, FIG. 3, its temperature is sensed by device 154. If the mixed fluid temperature is not as desired, then calibration knob 148 is used to reset the position of the device 154 body 158. This in turn repositions the sleeve 138 along the axis 134, FIG. 5, to reset the relative size of the open portions of the slots 124 and 126. The temperature of the water is again measured and the process repeated until the output mixed water from nozzle 120 is at the desired temperature. Once the desired temperature is set by the position of calibration screw 149, the system will then dither about the correct temperature in a desired small range of temperatures. The calibration screw 92 for adjusting the steam quantity entering the poppet valve 42 may also be set during this calibration process if the calibration screw 149 can not set the mixed hot water temperature to the desired temperature.

The sensing device automatically adjusts the position of the sleeve 138 (FIG. 5) in response to the sensed mixed water temperature. The following tables illustrate the various temperatures of the mixed hot water with flow rates of the steam and mixed cold water through the disc member 180 for different inlet steam and water pressures.

TABLE I

| FINAL MIXED TEMPERATURE | STEAM AND WATER FLOW GPM | INLET COLD WATER PRESS PSI | INLET STEAM PRESSURE PSI |
|---|---|---|---|
| 180 | 4 | 50 | 110 |
| 170 | 4 | 50 | 110 |
| 160 | 4.5 | 50 | 110 |
| 150 | 4.75 | 50 | 110 |
| 140 | 4.75 | 50 | 110 |
| 130 | 5 | 50 | 110 |
| 120 | 5 | 50 | 110 |
| 115 | 5 | 50 | 100 |
| 100 | 5 | 50 | 100 |

TABLE II

| FINAL MIXED TEMPERATURE | STEAM AND WATER FLOW GPM | INLET COLD WATER PRESS PSI | INLET STEAM PRESSURE PSI |
|---|---|---|---|
| 180 | 3 | *70 | *150 |
| 170 | 3.25 | | |
| 160 | 4 | | |
| 150 | 4 | | |
| 140 | 5 | | |
| 130 | 5.5 | | |
| 120 | 5.5 | | |
| 115 | 6 | | |
| 100 | N/A | | |

0.5 back off turn of screw 92
*These are the same values for all mixed temperatures

TABLE III

| FINAL MIXED TEMPERATURE | STEAM AND WATER FLOW GPM | INLET COLD WATER PRESS PSI | INLET STEAM PRESSURE PSI |
|---|---|---|---|
| 180 | 3 | *60 | *150 |
| 170 | 3 | | |
| 160 | 3.75 | | |
| 150 | 4 | | |
| 140 | 4.25 | | |
| 130 | 5 | | |
| 120 | 5.25 | | |
| 115 | 5.5 | | |
| 100 | 5.5 | | |

TABLE IV

| FINAL MIXED TEMPERATURE | STEAM AND WATER FLOW GPM | INLET COLD WATER PRESS PSI | INLET STEAM PRESSURE PSI |
|---|---|---|---|
| 180 | 3 | *50 | *150 |
| 170 | 3 | | |
| 160 | 3.5 | | |
| 150 | 4 | | |
| 140 | 4.5 | | |
| 130 | 5 | | |
| 120 | 5 | | |
| 115 | 5 | | |
| 100 | 5 | | |

TABLE V

| FINAL MIXED TEMPERATURE | STEAM AND WATER FLOW GPM | INLET COLD WATER PRESS PSI | INLET STEAM PRESSURE PSI |
|---|---|---|---|
| 180 | ** 3 *** | *50 | *135 |
| 170 | 3,.5 | | |
| 160 | 3.75 | | |
| 150 | 4 | | |
| 140 | 5 | | |
| 130 | n/a | | |
| 120 | n/a | | |
| 115 | n/a | | |
| 100 | n/a | | |

**steam setting at 1.0 back off turn of screw 92
***steam setting at 0.5 back off turn of screw 92

TABLE VI

| FINAL MIXED TEMPERATURE | STEAM AND WATER FLOW GPM | INLET COLD WATER PRESS PSI | INLET STEAM PRESSURE PSI |
|---|---|---|---|
| 180 | 4.75 | *60 | *135 |
| 170 | 5 | | |
| 160 | 5 | | |
| 150 | 5.25 | | |
| 140 | 5.5 | | |
| 130 | 5.5 | | |
| 120 | 5.5 | | |
| 115 | 5.5 | | |
| 100 | 5.5 | | |

TABLE VII

| FINAL MIXED TEMPERATURE | STEAM AND WATER FLOW GPM | INLET COLD WATER PRESS PSI | INLET STEAM PRESSURE PSI |
|---|---|---|---|
| 180 | 5 | *70 | *135 |
| 170 | 5.25 | | |
| 160 | 5.5 | | |
| 150 | 5.75 | | |
| 140 | 5.75 | | |
| 130 | 6 | | |
| 120 | 6 | | |
| 115 | 6 | | |
| 100 | n/a | | |

TABLE VIII

| FINAL MIXED TEMPERATURE | STEAM AND WATER FLOW GPM | INLET COLD WATER PRESS PSI | INLET STEAM PRESSURE PSI |
|---|---|---|---|
| 180 | 5 | *80 | *135 |
| 170 | 5.5 | | |
| 160 | 6 | | |
| 150 | 6 | | |
| 140 | 6 | | |
| 130 | 6 | | |
| 120 | 6.25 | | |
| 115 | 6.25 | | |
| 100 | 6.25 | | |

TABLE IX

| FINAL MIXED TEMPERATURE | STEAM AND WATER FLOW GPM | INLET COLD WATER PRESS PSI | INLET STEAM PRESSURE PSI |
|---|---|---|---|
| 180 | 5 | *80 | *135 |
| 170 | 5.25 | | |
| 160 | 5.5 | | |
| 150 | 6 | | |
| 140 | 6 | | |
| 130 | 6 | | |
| 120 | 6.25 | | |
| 115 | 6.25 | | |
| 100 | 6.25 | | |

TABLE X

| FINAL MIXED TEMPERATURE | STEAM AND WATER FLOW GPM | INLET COLD WATER PRESS PSI | INLET STEAM PRESSURE PSI |
|---|---|---|---|
| 180 | 4.75 | *70 | *125 |
| 170 | 5 | | |
| 160 | 5.5 | | |
| 150 | 5.75 | | |
| 140 | 6 | | |
| 130 | 6 | | |
| 120 | 6 | | |
| 115 | 6 | | |
| 100 | 6 | | |

From the above tables it is evident that controlled temperatures are provided the mixed steam and cold water at a wide range of pressures of the inlet steam and inlet cold water with the output of mixed hot water flowing at a rate in the range of about 4 to 6.5 GPM. The passages 202 in the disc member 180 are provided in number and size to permit such flow rates for the given pressure ranges. It can be shown by still other tables that the temperatures of the mixed water are maintained for flow rates and different temperatures in the overall ranges given for still different combinations of pressures.

Figure 1:
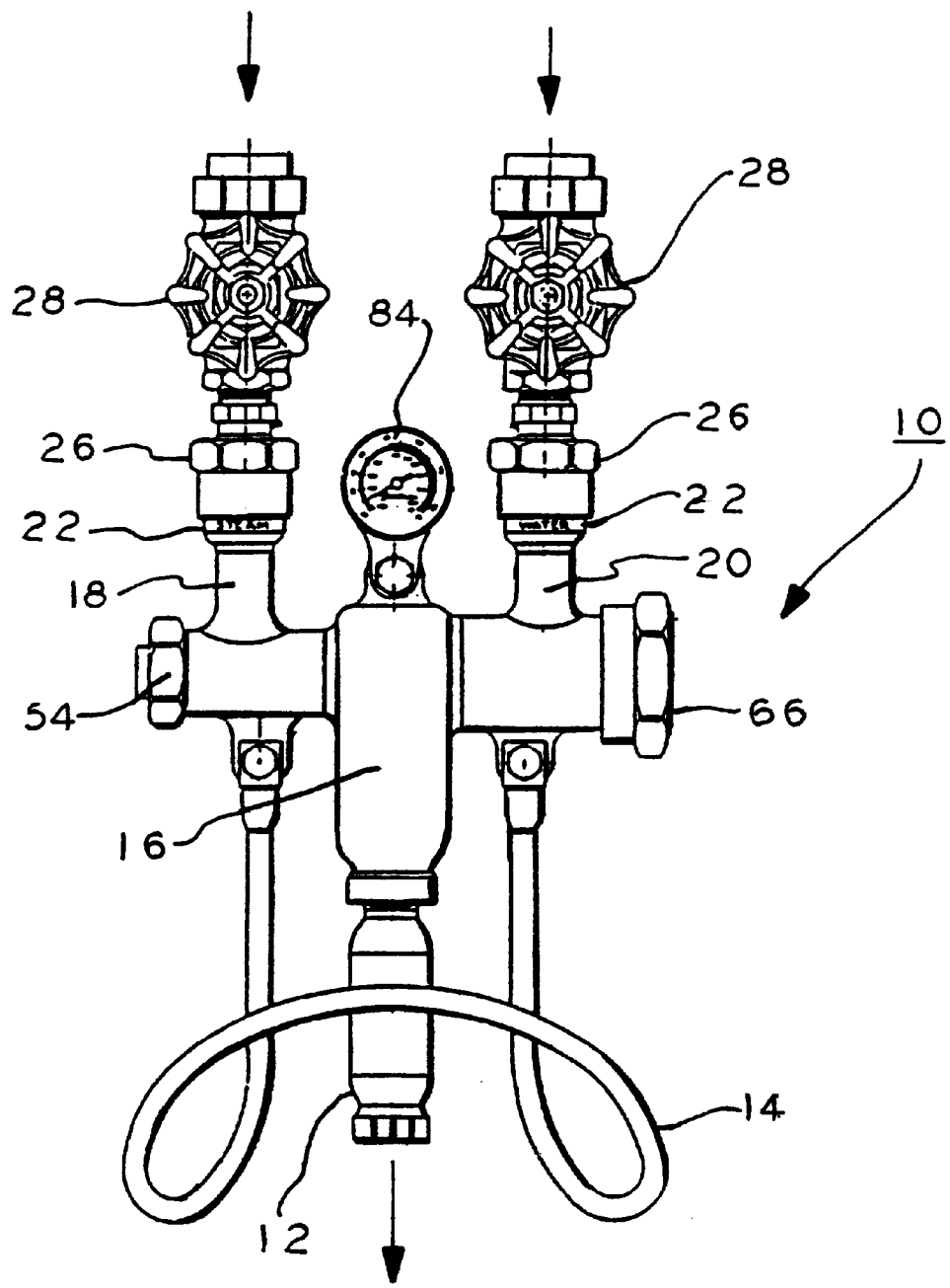
FIG. 1 is a front elevation view of a prior art valve assembly for mixing steam with cold water to produce hot water.

There thus has been shown a retrofit steam water mixing apparatus for generating hot water for existing mixing valve assemblies 10, FIG. 1, in the prior art. The only parts of the prior valve that need replacement are the relative low cost cap 52, FIG. 2, with the cap 90, FIG. 3, with the screw 92 for the steam inlet control, replacement of the apertured piston 72, FIG. 2, with the piston 94, FIG. 3, replacement of cap 62, FIG. 2, with cap 96, FIG. 3, and its attached fitting 100 and conduit 102 and replacement of the steam jet 49, FIG. 2, with the steam jet 106, FIG. 3. Such parts are readily made available in a retrofit kit and interchanged in the field by users of the prior art valve assembly 10, FIG. 1, keeping in mind, that the valve assembly 10 is in wide use, has been marketed for many years, and is robust with a long life. Such users have felt a long felt need for such a retrofit temperature controlled water-steam mixing assembly to compensate for wide temperature fluctuations in the present prior art valve assemblies.

The retrofit temperature controlling water-steam mixing assembly 87, FIG. 3, is factory provided and merely attached in the field by the users to the outlet nozzle 12 (FIG. 1) of the prior art body 16 by fitting coupling member 122 supplied with the retrofit kit after modifying the valve assembly 10 with retrofit replacement parts as described above.

In the prior art valve assembly system the water pressure opened the steam valve partially to form a self regulating system. The water pressure varied the steam pressure automatically. In the current retrofit assembly, the need is to control the mixed water temperature to a predetermined value. The amount of water and steam mixed is controlled by the retrofit assembly to balance these fluids produce the desired temperature in the presence of varying pressures of the steam and cold water.

Since the present system is used with a spray nozzle and hose, these can create back pressure which is undesirable. The retrofit temperature control assembly thus needs to take into consideration the possible existence of such back pressure and control the hot water temperature and flow rates accordingly.

It will occur to one of ordinary skill that various modifications may be made to the disclosed embodiments which are given by way of example and not limitation. Various materials and dimensions are exemplary and not limiting. The shapes and functions of various components may be different than the disclosed embodiments according to a given implementation. For example the steam jet may be optional depending upon the pressure of the incoming steam. It is used to normalize the inlet steam to a workable pressure range for the mixing apparatus. The shape of the slots in the conduit 102 may differ from that shown according to different steam and water inlet pressure parameters. The recess 196, FIG. 11, in the disc member 180 is optional to save the cost of forming the passages therethrough in thicker material.

It is intended that the scope of the invention is as defined in the appended claims.

What is claimed is:

1. A hot water temperature controlling apparatus for retrofit attachment to a cold water-steam valve assembly for mixing steam with cold water supplied to the valve assembly to produce controlled temperature hot water, the valve assembly for receiving pressurized steam and for receiving pressurized cold water, a poppet valve in a steam receiving chamber having open and closed states to selectively supply pressurized steam to a steam outlet conduit, a cold water receiving chamber for receiving cold water and having a cold water outlet, a piston in the cold water receiving chamber being responsive to the received pressurized cold water for opening the poppet valve, the water temperature controlling apparatus comprising:

first means arranged and dimensioned for receiving the steam from said steam outlet conduit and for receiving the cold water from said cold water chamber outlet; and temperature control means including temperature sense means arranged to be attached to the cold water-steam valve assembly and for receiving the steam and cold water from the first means and having a steam-cold water mixing chamber for mixing the received steam and cold water to produce hot water, the temperature sense means including means responsive to the sensed temperature of the hot water to control the respective amounts of steam and cold water supplied to the mixing chamber to control the temperature of the hot water.

2. The hot water temperature controlling apparatus of claim 1 wherein the mixing chamber is formed by a housing and a hot water outlet wall, the hot water outlet wall having a plurality of apertures there through arranged for enhancing the mixing of the steam and cold water and for supplying the mixed steam and cold water to a hot water outlet conduit.

3. The hot water temperature controlling apparatus of claim 1 wherein the temperature control means comprises a fluid conduit located in the mixing chamber, the fluid conduit having a first section for receiving said cold water and a second section fluid isolated from the first section for receiving said reduced pressure steam, and a valve member coupled to the fluid conduit for selectively fluid coupling the first and second sections to the mixing chamber in accordance with the value of the sensed temperature of the mixed steam and cold water.

4. The hot water temperature controlling apparatus of claim 3 wherein the fluid conduit has a longitudinal axis, the fluid conduit having a first fluid opening in the first section and a second fluid opening in the second section axially spaced from the first opening, each opening being of a given area magnitude for providing fluid communication between the respective fluid conduit first and second sections and the mixing chamber, said valve member forming a sleeve being arranged to selectively set and apportion the magnitude of said openings in fluid communication with said mixing chamber simultaneously in accordance with said sensed temperature value.

5. The hot water temperature controlling apparatus of claim 4 wherein the magnitude of each said openings is varied inversely by the position of said sleeve along said conduit.

6. The hot water temperature controlling apparatus of claim 4 wherein the first and second openings are each oriented on a radius extending from the axis, the radii being oriented in different radial positions relative to a reference position about the axis for enhancing mixing of the steam and cold water.

7. The hot water temperature controlling apparatus of claim 6 wherein the radii are oriented at about right angles relative to each other about the axis.

8. The hot water temperature controlling apparatus of claim 4 wherein the fluid openings each are in the form of a slot extending transversely the axis.

9. The hot water temperature controlling apparatus of claim 1 wherein the apparatus further includes means for settably setting the maximum displacement value that the poppet valve can open.

10. The hot water temperature controlling apparatus of claim 1 wherein the temperature control means comprises:

a body having said mixing chamber, connecting means for connecting the body to the valve assembly;

a first fluid conduit having first and second fluid isolated sections, the sections being located in the mixing chamber, the first section coupled to the valve assembly for receiving said reduced pressure steam, each section having an opening fluid coupled to the mixing chamber;

a second fluid conduit coupled to the cold water outlet for receiving said cold water and applying the cold water to the second section;

a valve member coupled to the first fluid conduit for selectively opening and closing the openings of the first and second sections in fluid communication with the mixing chamber to proportion the amount of steam and cold water supplied to the mixing chamber;

a temperature sensing device secured to the body for sensing the temperature of hot water in the mixing chamber and for setting the position of the valve member in the mixing chamber according to the sensed temperature; and a hot water outlet chamber coupled to the mixing chamber for outputting hot water generated in said mixing chamber.

11. The hot water temperature controlling apparatus of claim 10 wherein the mixing chamber includes a wall member separating said mixing chamber from said hot water outlet, the wall member including a plurality of apertures therethrough arranged to enhance mixing of the steam and cold water and to provide passage of the mixed hot water from the mixing chamber to the hot water outlet chamber.

12. The hot water temperature controlling apparatus of claim 10 including calibration means coupled to the body and to the temperature sense means for adjustably setting the temperature of the mixed hot water.

13. A hot water temperature controlling apparatus comprising:

a body having a steam receiving chamber, a cold water receiving chamber, and a steam-cold water mixing chamber for producing hot water, the cold water receiving chamber having a cold water outlet conduit, the steam receiving chamber having a steam outlet conduit;

a poppet valve in the steam receiving chamber having open and closed states for selectively supplying pressurized steam to the steam outlet conduit;

a piston in the cold water receiving chamber responsive to received pressurized cold water for opening the poppet valve;

a first fluid conduit secured to the body at least a portion of which is in the mixing chamber and having first and second fluid isolated sections in the mixing chamber, the first section for receiving the steam from said steam outlet conduit and the second section for receiving the cold water from said cold water outlet conduit;

valve means comprising a sleeve coupled to the first conduit for selectively opening and closing fluid coupling of the first and second sections to the mixing chamber; and temperature sense means coupled to the valve means and responsive to the sensed temperature of the mixed hot water in the mixing chamber to displace the sleeve and control the respective amounts of steam and cold water supplied to the mixing chamber by the sleeve to thereby control the temperature of the hot water.

14. The hot water temperature controlling apparatus of claim 13 including an adjustable poppet stop member having a stem for selective engagement with the poppet valve, the stop member for limiting the maximum displacement of the poppet valve during opening of the valve, and adjustment means for setting the value of the maximum displacement of the poppet valve.

15. The hot water temperature controlling apparatus of claim 13 wherein the first fluid conduit has a longitudinal axis, the first fluid conduit having a first fluid opening in the first section and a second fluid opening in the second section axially spaced from the first opening, each opening being of a given area magnitude for providing fluid communication between the respective fluid conduit first and second sections and the mixing chamber, said sleeve being arranged to selectively set and apportion the magnitude of said openings in fluid communication with said mixing chamber simultaneously in accordance with said sensed temperature value.

16. The hot water temperature controlling apparatus of claim 15 wherein the first and second openings are each oriented on a radius extending from the axis, the radii being oriented in different radial positions relative to a reference position about the axis for enhancing mixing of the steam and cold water.

17. The hot water temperature controlling apparatus of claim 16 wherein the radii are oriented at about right angles relative to each other about the axis.

18. The hot water temperature controlling apparatus of claim 13 wherein the mixing chamber has a hot water outlet wall, the hot water outlet wall having a plurality of apertures therethrough arranged for enhancing the mixing of the steam and cold water and for supplying the mixed steam and cold water to a hot water outlet conduit.

* * * * *